UNITED STATES PATENT OFFICE.

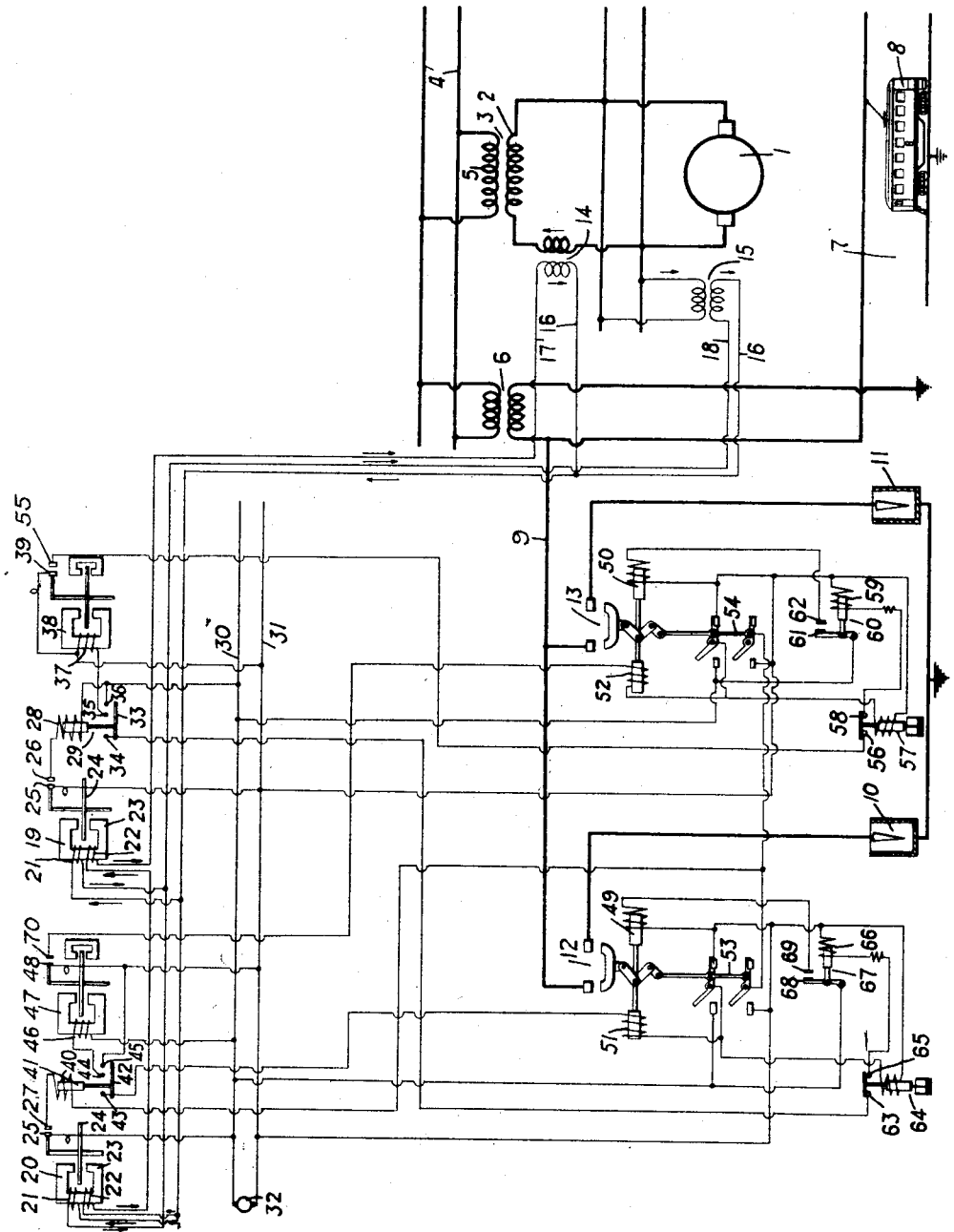

CHARLES McL. MOSS, OF PITTSBURGH, AND HENRY A. TRAVERS, OF WILKINSBURG, PENNSYLVANIA, ASSIGNORS TO WESTINGHOUSE ELECTRIC AND MANUFACTURING COMPANY, A CORPORATION OF PENNSYLVANIA.

SYSTEM OF DISTRIBUTION.

1,210,094.  Specification of Letters Patent.  Patented Dec. 26, 1916.

Application filed December 4, 1915. Serial No. 65,068.

*To all whom it may concern:*

Be it known that we, CHARLES McL. MOSS, a citizen of the United States, and a resident of Pittsburgh, in the county of Allegheny and State of Pennsylvania, and HENRY A. TRAVERS, a citizen of the United States, and a resident of Wilkinsburg, in the county of Allegheny and State of Pennsylvania, have invented a new and useful Improvement in Systems of Distribution, of which the following is a specification.

Our invention relates to systems of electric distribution and particularly to automatically-controlled means for absorbing the excess-regenerated energy produced by devices operating in such systems.

The object of our invention is to provide a system of the above indicated character having means for automatically controlling the energy-absorbing means in accordance with the regenerated energy in the circuit.

It is a well known expedient in electric-railway systems to utilize the regenerated energy of an electrically-propelled vehicle moving down grade to propel other vehicles and also for dynamic braking purposes. However, if this energy is not consumed, it will be transmitted to the generating station and thus cause the speed of the generators to increase. In order to prevent over speeding of the generators, we provide resistors or energy-absorbing means for absorbing the regenerated energy that exceeds predetermined values, and we further provide means for automatically controlling the connection of the resistors or energy absorbing means to the circuit.

The single figure of the accompanying drawing is a diagrammatic illustration of an electrical-distribution system embodying our invention.

A generator 1 is operatively connected to the primary winding 2 of a transformer 3 the secondary winding 5 of which is connected to a feeder circuit 4. The primary winding of a transformer 6 is connected to the circuit 4 and its secondary winding is connected to a trolley circuit 7. When an electric locomotive 8 or other electrically operated vehicle moves down grade it regenerates energy that ordinarily traverses the circuit 7, the circuit 4 and the generator 1. In order to absorb this regenerated energy, a conductor 9 is connected to the grounded conductor of the circuit 7, and two resistors or energy-absorbing devices 10 and 11 are connected between the conductor 9 and the ground. Two circuit interrupters 12 and 13 are interposed between the resistors 10 and 11 and the conductor 9 for the purpose of controlling the circuit of the resistors and, consequently, the amount of energy absorbed.

A current transformer 14 is connected in series relation to the generator 1, and a potential transformer 15 is connected across the terminals of the generator. The terminals of the secondary winding of the transformer 14 are connected to two conductors 16 and 17, respectively, and the two terminals of the secondary winding of the transformer 15 are connected to two conductors 16 and 18, respectively. The conductors 16, 17 and 18 constitute a relay circuit to which two reverse-energy relays 19 and 20 are connected.

The relays 19 and 20 severally comprise a potential winding 21, a current winding 22, a magnetizable core member 23 and an armature 24 that is adapted to actuate a movable contact member 25. The current windings 22 of the relays 19 and 20 are so similarly connected and the potential windings 21 are so oppositely connected that the relay 19 will operate when the normal flow of energy in the circuit is reversed, and the relay 20 will operate when the energy traverses the circuit in its normal direction.

The movable contact members 25 of the relays 19 and 20 are adapted to engage stationary contact members 26 and 27, respectively. The stationary contact member 26 of the relay 19 is connected to one terminal of the winding 28 of a relay 29 the other terminal of which is connected to one conductor 30 of an auxiliary circuit that comprises, besides the conductor 30, a second conductor 31 and a source 32 of electromotive force. The movable contact member 33 of the relay 29 is adapted to engage three stationary contact members 34, 35 and 36. The stationary contact member 35 is connected to one terminal of the winding 37 of a time-limit relay 38 the other terminal of which is connected to its movable contact member 39 and to the conductor 31. The stationary contact member 36 of the relay 29 is connected to the conductor 30. The stationary contact member 27 of the relay 20 is connected to one terminal of the winding 40 of a relay 41 the movable contact member 42 of which is adapted to engage three stationary contact members 43, 44 and 45. The stationary contact member 44 is connected to one terminal of the winding 46 of a time-limit relay 47 the other terminal of which is connected to the conductor 30. The relay 47 is provided with a movable contact member 48 that is operatively connected to the stationary contact member 45 and to the conductor 31 of the auxiliary circuit.

The circuit interrupters 12 and 13 comprise closing electromagnets 49 and 50, tripping electromagnets 51 and 52 and double-throw switches 53 and 54, respectively. The stationary contact member 55 of the relay 38 is connected to a stationary contact member 56 of a time-limit relay 57, and the second stationary contact member 58 of the relay 57 is connected to one terminal of the winding 59 of a relay switch 60, the other terminal of the winding 59 being connected to the conductor 31.

The relay switch 60 comprises a movable contact member 61 that is connected to the conductor 30 and a stationary contact member 62 that is connected to one terminal of the winding of the closing electromagnet 50, the other terminal of which is connected to the conductor 31. The stationary contact member 34 of the relay 29 is connected to a stationary contact member 63 of a time-limit relay 64, and the second stationary contact member 65 of the relay 64 is connected to one terminal of the winding 66 of a relay switch 67, the other terminal of which is connected to the conductor 31.

The relay switch 67 comprises a movable contact member 68 that is connected to the conductor 30 and a stationary contact member 69 that is connected to one terminal of the winding of the closing electromagnet 49, the other terminal of which is connected to the conductor 31. The stationary contact member 43 of the relay 41 is connected to one terminal of the winding of the tripping electromagnet 51, the other terminal of which is connected to one terminal of the winding of the relay 64, and the other terminal of the winding of the relay 64 is connected to one terminal of the winding 66 of the relay switch 67. The stationary contact member 70 of the relay 47 is connected to one terminal of the winding of the tripping electromagnet 52, the other terminal of which is connected to the one terminal of the winding of the relay 57, and the other terminal of the latter is connected to the one terminal of the winding 59.

The double-pole double-throw switches 53 and 54 are operated by the circuit interrupters 12 and 13, respectively, and are adapted to energize the windings of the relays 64 and 57 after the interrupters are closed for the purpose of actuating the contact members 68 and 61 of the switches 61 and 60, respectively, to open-circuit the windings of the closing electromagnets 49 and 50 a suitable time interval after the closure of the circuit interrupters. Since this is only incidental to the operation of our invention, it will not be discussed in detail.

Assume, for the purpose of explanation, the resistors 10 and 11 to be capable of absorbing substantially 2000 kilowatts of energy and the generator 1 to have losses of substantially 300 kilowatts. Assume further, the relay 19 to be so adjusted that, when the total regenerated energy exceeds 300 kilowatts, the contact members 25 and 26 will engage. The engagement of the contact members 25 and 26 causes the winding 28 to move the movable contact member 33 upwardly to engage the stationary contact members 34, 35 and 36. The engagement of the contact members 33 with the contact members 34, 35 and 36 effects the closure of two circuits. One of the circuits extends from the conductor 30 through the contact members 36, 33 and 34, the stationary contact members 63 and 65, the movable contact member of the relay 64 and the winding 66 to the conductor 31, thus effecting engagement of the contact members 68 and 69 and the energization of the winding of the closing electromagnet 49. The second circuit extends from the conductor 30 through the contact members 36, 33 and 35 and the winding 37 of the relay 38 to the conductor 31, thus causing the movable member of the relay 38 to operate after a predetermined time interval to effect engagement of the contact members 39 and 55.

Assume, for the purpose of explanation, that the regenerated energy is substantially 500 kilowatts, which is sufficient to cause the contacts 25 and 26 to engage and the circuit interrupter 12 to close. When the circuit interrupter 12 is closed, 2000 kilowatts of energy will be consumed in the resistor 10, 500 kilowatts of this being supplied by the regenerated energy of the locomotive 8, and 1500 kilowatts being supplied by the generator 1. Thus, the contacts 25 and 26 will be immediately disengaged because the 1500 kilowatts of energy is in the correct direction, and the disengagement of the contact members causes the disengagement of the contact member 33 and the stationary contact members 34, 35 and 36, which deënergizes the winding 37 of the relay 38.

If the generated energy increases to a total value of 2300 kilowatts or more, the resistor 10 consumes only 2000 kilowatts, and the other 300 kilowatts will be absorbed by the generator 1, thus causing the energy to flow in the reverse direction from the current transformer 14. The relay 19 will again operate to complete the circuit of the winding 28 of the relay 29, and, consequently, to energize the winding 37 of the relay 38, which, after a time interval, will cause the contact member 39 to engage the contact member 55 to effect the closure of the circuit interrupter 13 through the relay switch 60 and the operating electromagnet 50, substantially as set forth with respect to the circuit interrupter 12. The total energy consumption is now 4000 kilowatts, 2300 kilowatts or more of this being supplied by the regeneration of energy from the locomotive 8, and 1700 kilowatts or less being supplied by the generator 1. This causes energy to flow in the proper direction in the transformer 14, and the contact members 25 and 26 of the relay 19 to be disengaged. The system will continue in this condition until the regenerated energy falls below 2000 kilowatts.

When the regenerated energy falls below 2000 kilowatts, 2000 kilowatts will be supplied by the generator 1, in the correct direction, the balance being absorbed by the resistors 10 and 11. The energy flowing in the correct direction through the transformer 14 causes the relay 20 to effect engagement of the contact members 25 and 27 to complete the circuit of the winding 40 of the relay 41, and thus to energize the winding of the tripping electromagnet 51. The energization of the electromagnet 51 trips the circuit interrupter 12 and also effects the energization of the winding 46 of the relay 47, which, after a predetermined time, causes the engagement of the contact members 48 and 70 and the tripping of the circuit interrupter 13. However, if the regenerated energy is, for example, 1500 kilowatts or less when the second interrupter 12 opens, 1500 kilowatts of regenerated energy will be absorbed by the resistor 11 and only 500 kilowatts of direct generated energy will pass through the transformer 14, and, consequently, the contact members of the reverse-energy relay 20 will open to cause a deënergization of the winding 40 of the relay 41 and thus prevent engagement of the contact members 48 and 70. However, if the regenerated energy falls off to zero or even becomes direct-generated energy, the contact members 25 and 27 will engage, and, if these conditions persist for a predetermined time, engagement of the contact members 48 and 70 will be effected to trip the circuit interrupter 13. After the tripping of the circuit interrupter 13, the relays return to their initial positions.

It will be understood that the device is so arranged that the cycle of events may be interrupted at any point and reversed or continued as conditions obtain, thus providing a device that is always in operative position.

We do not limit our invention to the particular types of relays, circuit interrupters and resistors or energy-absorbing devices illustrated, as many modifications may be made without departing from the spirit and scope of our invention as set forth in the appended claims.

We claim as our invention:

1. An electrical-distribution system comprising a source of power, a distributing circuit, energy-absorbing means, circuit interrupters between the energy-absorbing means and the circuit, and reverse-energy relays so connected to the said circuit and adapted to so control the operation of the circuit interrupters that reverse energy exceeding a predetermined value shall be absorbed by the energy-absorbing means.

2. In a system of distribution, the combination with a source of energy and a load adapted to regenerate energy under predetermined conditions, of a plurality of energy-absorbing devices, circuit interrupters operatively connected between the system of distribution and the absorbing devices, and a relay device adapted to so control the operation of the interrupters that, when the regenerated energy exceeds a predetermined value, it shall be absorbed by the absorbing devices.

3. In a system of distribution, the combination with a source of energy and a load adapted to regenerate energy under predetermined conditions, of an energy-absorbing device, a circuit interrupter operatively connected between the system of distribution and the absorbing device, and a reverse-energy relay device adapted to so control the operation of the interrupter that, when the regenerated energy exceeds predetermined values, it shall be absorbed by the absorbing device.

4. In a system of distribution, the combination with a source of energy, a feeder circuit and means operatively connected to the feeder circuit for regenerating energy, of resistors, circuit interrupters operatively connected between the resistors and the feeder circuit, two sets of reverse-energy relays, one for controlling the closure of the interrupters and the other the tripping thereof when the regenerated energy varies from a predetermined value.

5. In a system of distribution, the combination with a source of energy, a feeder circuit and means operatively connected thereto for regenerating energy, under predetermined conditions, of resistors, circuit interrupters for operatively connecting the resistors to the circuit, a time-limit reverse-energy relay for effecting closure of the interrupters when the regenerated energy exceeds predetermined values and another time-limit reverse-energy relay for effecting the opening of the interrupters when the regenerated energy decreases to predetermined values.

6. In a system of distribution, the combination with a source of energy, a feeder circuit and means operatively connected thereto for regenerating energy, under predetermined conditions, of resistors, circuit interrupters for operatively connecting the resistors to the circuit, means for closing the circuit interrupters in timed sequence upon the regeneration of energy of a predetermined value, and means for tripping the interrupters in the reverse order of closure.

7. In a system of distribution, the combination with a source of energy and a load adapted to regenerate energy under predetermined conditions, of an energy-absorbing device, a switch operatively connected between the system of distribution and the absorbing device, and means adapted to so control the operation of the switch that, when the regenerated energy exceeds a predetermined value, it shall be absorbed by the absorbing device.

In testimony whereof, we have hereunto subscribed our names this 1st day of Dec., 1915.

CHARLES McL. MOSS.
HENRY A. TRAVERS.

Copies of this patent may be obtained for five cents each, by addressing the "Commissioner of Patents, Washington, D. C."